US005542106A

United States Patent [19]

Krenz et al.

[11] Patent Number: 5,542,106

[45] Date of Patent: Jul. 30, 1996

[54] ELECTRONIC DEVICE HAVING AN RF CIRCUIT INTEGRATED INTO A MOVABLE HOUSING ELEMENT

[75] Inventors: Eric L. Krenz, Crystal Lake; James P. Phillips, Lake in the Hills, both of Ill.

[73] Assignee: Motorola, Inc., Schaumburg, Ill.

[21] Appl. No.: 306,357

[22] Filed: Sep. 15, 1994

[51] Int. Cl.[6] .......... H04B 01/38

[52] U.S. Cl. .......... 455/90; 455/129; 455/289; 455/347; 343/702

[58] Field of Search .......... 455/90, 89, 129, 455/289, 290, 347, 121; 343/702, 861; H01Q 1/24

[56] References Cited

U.S. PATENT DOCUMENTS

| | | | |
|---|---|---|---|
| 4,992,799 | 2/1991 | Gavay | 343/702 |
| 5,170,173 | 12/1992 | Krenz et al. | 455/347 X |
| 5,335,368 | 8/1994 | Tamura | 455/90 |
| 5,337,061 | 8/1994 | Pye et al. | 343/702 |

*Primary Examiner*—Andrew Faile
*Assistant Examiner*—Philip J. Sobutka
*Attorney, Agent, or Firm*—Kirk W. Dailey; Randall S. Vaas

[57] ABSTRACT

When a radio frequency (RF) circuit is integrated into a movable housing element of an electronic device one must consider the affects of the surrounding area when the RF circuit is in a functioning position. A preferred embodiment is a radiotelephone (100) having an antenna (105) integrated into a movable housing element (101). The antenna (105) has two functioning positions, an opened and a closed position. The antenna (105) is tuned for efficiency when the movable housing element (101) is in the opened position. When the movable housing element (101) is in the closed position, a first pair of conductive plates (107, 109) located in the movable housing element (101) and a second conductive plate (113) located in the second housing element (103) are positioned to retune the antenna (105) due to the detuning affects caused by the close proximity of other electronic components located in the second housing element (103).

7 Claims, 2 Drawing Sheets

ELECTRONIC DEVICE HAVING AN RF CIRCUIT INTEGRATED INTO A MOVABLE HOUSING ELEMENT

FIELD OF THE INVENTION

Generally, this invention relates to radio frequency (RF) circuits, including antennas, and more specifically to integrating those RF circuits into a movable housing element of an electronic device.

BACKGROUND OF THE INVENTION

Generally, electronic devices, such as portable radios, are becoming physically smaller and customers and manufacturers are demanding more features. Consequently, some radios require a compact integrated antenna to provide either a second antenna for diversity or to conceal the primary antenna for cosmetic purposes.

Since most of the surface area of a portable radio is normally obstructed by a user's hand, a logical location for an integrated antenna is in an extended portion of the radiotelephone housing. This extended housing may be realized by rotating a keypad cover outwards, by twisting a portion of the radiotelephone housing, or by sliding a portion of the radiotelephone housing from a first position to a second position. Such a portable radio has valid modes of operation when the housing element is in the first position as well as in the second position.

Consequently, any antenna or RF circuit designed to be integrated into a movable housing element must be designed such that it performs well in both in the first position and the second position. A difficulty in the antenna design arises when the antenna in the second position is in close proximity to the electrical components of the portable radio and the antenna in the first position is further away from the inner components of the radio. Typically, an antenna must be tuned to match the impedance of the power amplifier for maximum performance of the antenna. The matching of an antenna is highly dependent upon the position of the antenna during its operation. Here, the antenna has two physical positions in which it must operate efficiently. If the antenna is tuned when in the first position, then when the antenna is in the second position, near the electrical components of the transceiver, the antenna is detuned. A detuned antenna has a poor impedance match to the power amplifier and suffers a substantial loss of performance. Thus, it is necessary to develop an antenna that functions efficiently when the movable housing element is in the first position and in the second position.

DESCRIPTION OF THE PREFERRED EMBODIMENT

Figure 1:
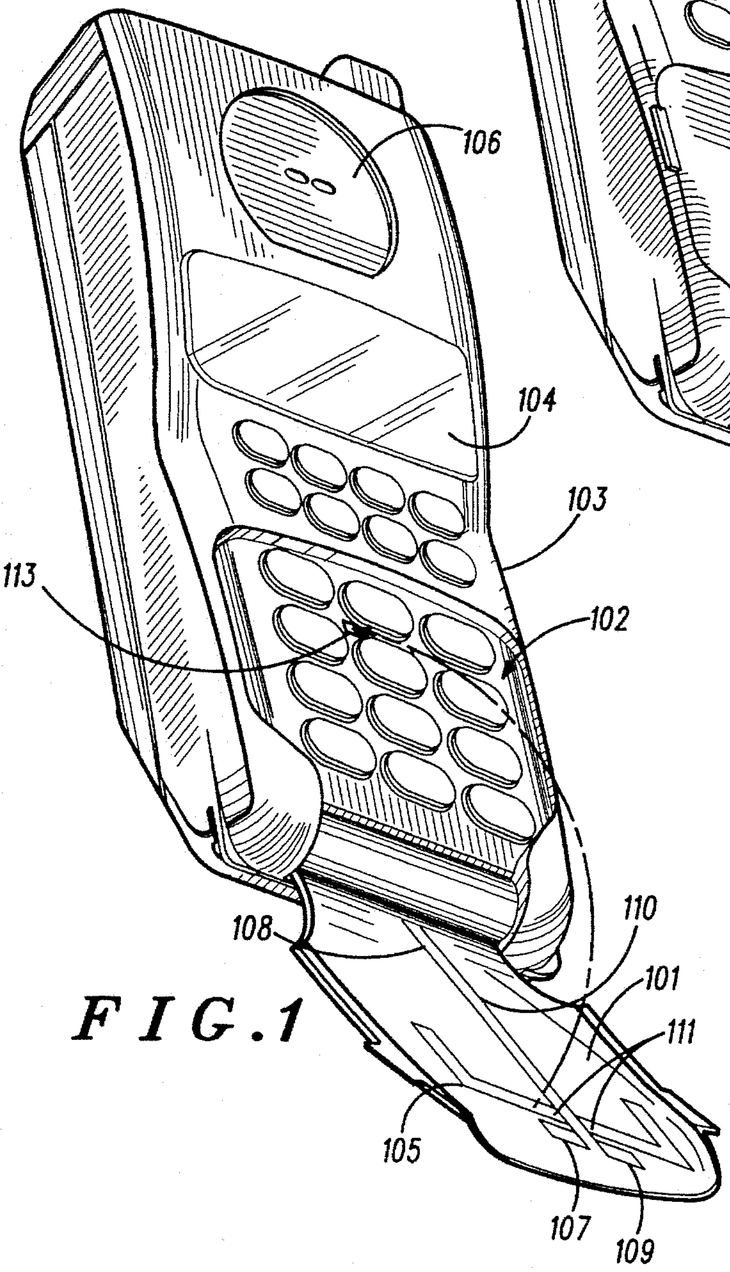
FIG. 1 is an illustration of a radiotelephone having a movable housing element in an opened position in accordance with the present invention.

FIG. 1 is an illustration of a preferred embodiment of the present invention. Here, an antenna system is integrated into a portable radiotelephone 100 such as a 1.9 GHz Japan pocket phone available from Motorola, Inc. A portable radiotelephone typically includes a keypad 102, a display 104, a speaker 106, a microphone (not shown) as well as the radiotelephone's electronic components. The radiotelephone 100 is part of a radio telephone system that uses radio frequency signals to communicate between a remote transceiver (not shown) and a plurality of radiotelephones, such as the radiotelephone 100 illustrated in FIG. 1. An antenna is used to send and receive radio frequency signals between the remote transceiver and the radiotelephone. As discussed in the background, it is desirable to provide an antenna integrated into an extendible portion of the radiotelephone's housing.

Figure 2:
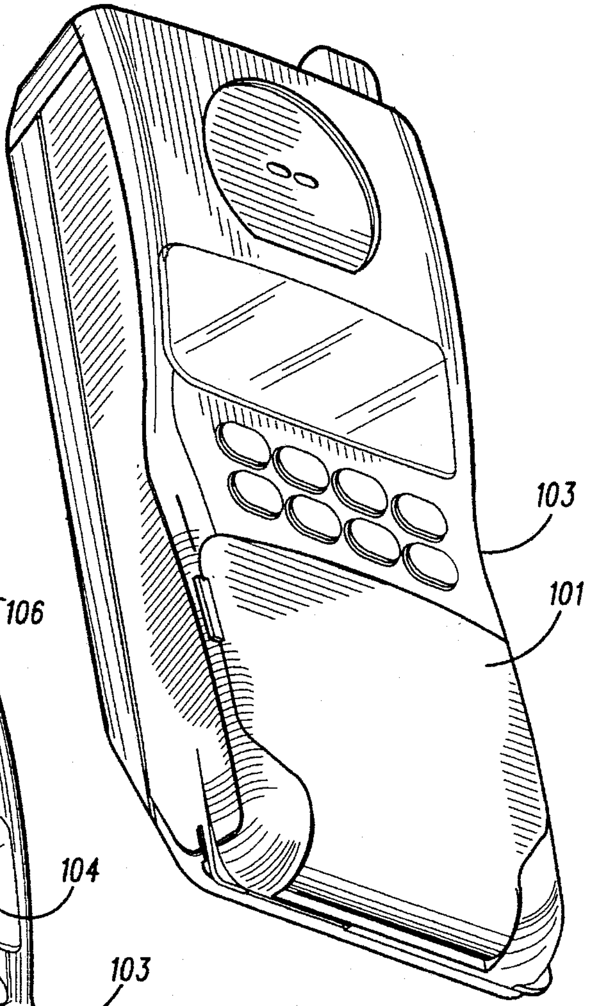
FIG. 2 is an illustration of the radiotelephone illustrated in FIG. 1 with the movable housing element in a closed position in accordance with the present invention.

Here, the housing of the radiotelephone 100 is separated into a first housing element 101 and a second housing element 103. The first housing element 101, also referred to as a keypad cover, is movable with respect to the second housing element 103. The second housing element 103 contains a substantial portion of the portable radiotelephone's electronic components. It is foreseeable that the present invention could be embodied in other radio apparatus where the first housing element is moved between the first position and the second position using a twisting motion, a rotating motion, or a sliding motion. FIG. 2 is an illustration of the radiotelephone 100 of FIG. 1 with the first movable housing element 101 in a closed, or second position.

In the preferred embodiment, the antenna system includes an antenna 105 disposed within the first movable housing element 101, a first pair of conductive plates 107, 109 disposed within the first movable housing element 101 and located at a feed point 111 of the antenna 105. Conductive plate 107 is electrically coupled to a first terminal 108 of the antenna 105, and conductive plate 109 is electrically coupled to a second terminal 110 of the antenna 105. In the preferred embodiment the antenna 105 is a half-wave dipole, however, other antennas could be substituted such as a loop antenna, a patch antenna, or a monopole antenna, or any other known antenna. Regardless of the type of antenna, the first pair of conductive plates 107, 109 are disposed at the feed point for the antenna 105. Here, the feed point 111 of the dipole is located as shown in FIG. 1. A second conductive plate 113 is disposed within the second housing element 103 as shown in FIG. 1. The conductive plates 107, 109 and 113 add shunt capacitance to the antenna system. Alternatively, the shunt load capacitance created by the conductive plates may be shifted away from the immediate feed point of the antenna. A very wide range of antenna impedance can be matched by changing the size of the capacitive plates and their location along the antenna or the transmission line in the flip that feeds the antenna.

Figure 3:
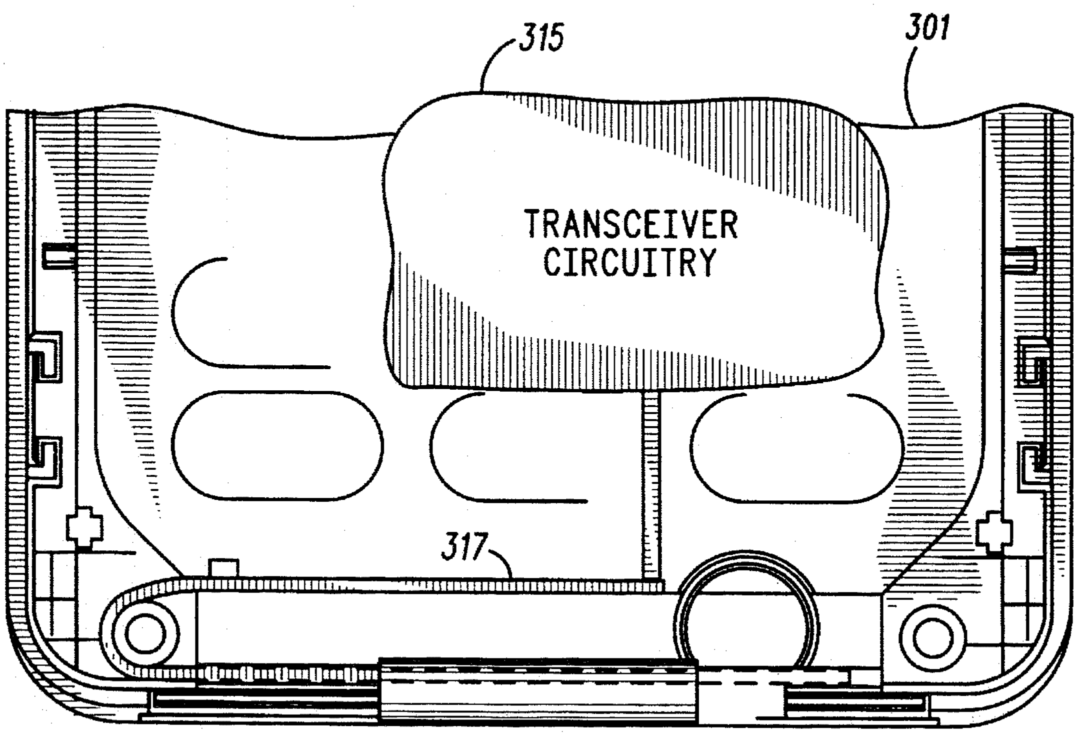
FIG. 3 is an illustration of a portion of the radiotelephone of FIG. 1 in accordance with the present invention.

FIG. 3 is an illustration of a portion of the radiotelephone 100 of FIG. 1. Specifically, FIG. 3 is used to illustrate a connection between the antenna 105 and a transceiver 315 via a transmission line 317. The transceiver 315 is a portion of the radiotelephone's electronic components. The antenna 105 is tuned to match the impedance of the transceiver 315 while the first movable housing element is in the open position, also referred to as the first position. When the first movable housing element 101 is in the first position, the first pair of conductive plates 107, 109 contribute only a small amount of shunt capacitance to the feed point impedance. This additional amount of shunt capacitance can be easily accounted for in the tuning of the antenna 105.

The second conductive plate 113 is positioned in the second housing element such that when the first movable housing element 101 is in the second position, the first pair of conductive plates 107, 109 and the second conductive plate 113 are parallel to and in very close proximity to each other. This parallel plate arrangement creates a substantial increase in the shunt capacitance across the antenna feed point 111. The increase shunt capacitance effectively retunes the antenna 105 to maintain maximum performance of the antenna 105 even though the antenna has been brought very close to the radiotelephone's electronic components.

When the antenna 105 is optimized with the first movable housing element 101 in the first position, as illustrated in FIG. 1, the antenna 105 is essentially tuned for free-space operation. When the first movable housing element 101 is in a second position, as illustrated in FIG. 2, it is close to the radiotelephone's electronics components. If dielectric is not present, image theory predicts with the first movable housing element in the second position the radiation resistance will drop and the antenna impedance will become dominated by capacitive reactance. In this case, adding shunt capacitance at the feed point will not compensate for the detuning affect caused by the radiotelephone's electronic components.

In the actual practice, when the first movable housing element 101 is in the second position, as illustrated in FIG. 2, the antenna 105 is not separated from the radiotelephone's electronic components by air, rather, they are separated by various dielectric layers created by the housing, keypad and display. These dielectric layers have dielectric constant which are greater than one. The presence of the higher dielectric material increases the effective electrical length of the antenna 105 when the first movable housing element 101 is in the second position, thus, causing the antenna impedance to become inductive rather than capacitive. Consequently, the addition of the shunt capacitance created by the conductive plates 107, 109, 113 rematches the antenna impedance to the transceiver's impedance. In other words, the shunt capacitance modifies the effective electrical length of the antenna 105 to equal the effective electrical length when the antenna 105 is in the first position. These effects have been verified by simulation and experiment as indicated in Tables 1–3.

Although the text of the preferred embodiment discusses the integration of an antenna into a movable housing element of a radiotelephone, the inventors envision their invention to be applicable to integrating any RF circuit into a movable housing element of an electronic device.

TABLE 1

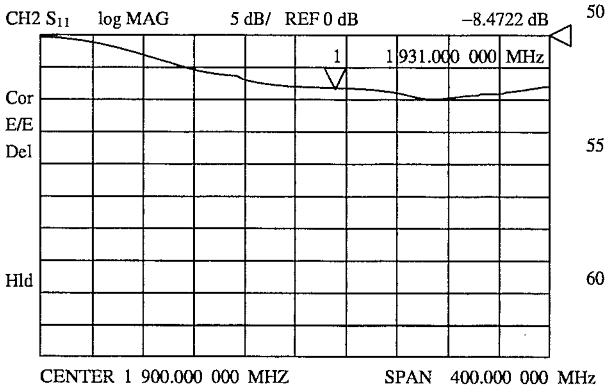

Return loss characteristic of the antenna in free space.

TABLE 2

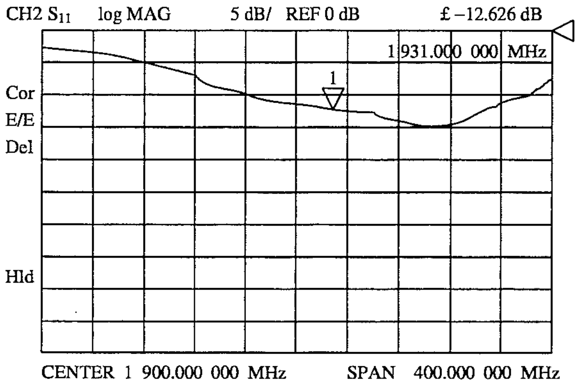

Return loss characteristic of the antenna in normal-use position near the user's head.

TABLE 3

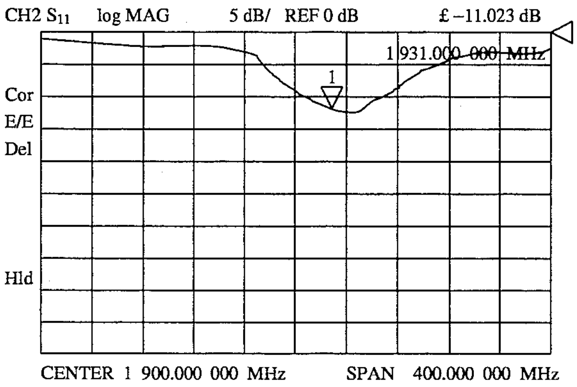

Return loss characteristic of the antenna in close proximity to the radio chassis (flip closed).

We claim:

1. An electronic device having a first housing element and a second housing element, where in the first housing element is movable between an open position and a closed position, the second housing element containing a substantial portion of the electronic device's electronic components, thereby creating a conductive body in the second housing element, the electronic device comprising:
   - an antenna having an impedance disposed within the first housing element;
   - a first conductive plate disposed within the first housing element and being coupled to the antenna; and
   - a second conductive plate disposed within the second housing element and positioned such that when the first housing element is in the open position the second conductive plate has a minimal effect on the impedance of the antenna and when the first housing element is in the closed position the second conductive plate is in close proximity to the first conductive plate thereby effecting the impedance of the antenna to counteract any effect on the impedance of the antenna caused by the conductive body whereby the antenna in the first housing element is tuned for use with the electronic circuitry in both the open and closed positions of the electronic device.

2. An electronic device in accordance with claim 1 wherein said antenna is a dipole antenna.

3. An electronic device in accordance with claim 1 further including a third conductive plate disposed within the first housing element and coupled to said dipole antenna, said first and third conductive plates coupled to said second conductive plate when the device is in the closed position.

4. A radio having a first housing element and a second housing element, where in the first housing element is movable between a first open position and a second closed position, the second housing element containing a substantial portion of the radio's electronic components, thereby creating a conductive body in the second housing element, the radio comprising:

an antenna having an electrical length, a feed point and being disposed within the first housing element;

at least a first conductive plate disposed within the first housing element and coupled to the antenna; and a second conductive plate disposed within the second housing element and positioned such that when the first housing element is in the first open position the second conductive plate has a minimal effect on the electrical length of the antenna and when the first housing element is in the second closed position the second conductive plate is in close proximity to the at least first conductive plate thereby capacitively coupling the first and second plates creating an effect on the electrical length of the antenna to counteract any effect on the electrical length of the antenna caused by the conductive body whereby the antenna in the first housing element is tuned for operation in both the open and closed positions.

5. A radio in accordance with claim 4 wherein said at least first conductive plate is connected to the feed point of the antenna.

6. A radio in accordance with claim 5 wherein said first antenna is a half-wave dipole antenna and further including a third conductive plate coupled to the feed point of the first antenna and capacitively coupled to the second conductive plate when the device is in the second closed position.

7. A radio communication device having a first housing element and a second housing element, the first housing element is movable between a first position and a second position, the second housing element containing a substantial portion of the radio communication device's electronic components, thereby creating a conductive body in the second housing element, the radio communication device comprising:

an antenna having a first impedance, a feed point, a first terminal, a second terminal and disposed within the first housing element;

a first pair of conductive plates disposed on the first terminal and the second terminal at the feed point of the antenna and within the first housing element; and a second conductive plate disposed within the second housing element and positioned such that when the first housing element is in the first position the second conductive plate has a minimal effect on the impedance of the antenna and when the first housing element is in the second position the second conductive plate is in close proximity to the first pair of conductive plates creating an effect on the impedance of the antenna to counteract any effect that the conductive body has on the impedance of the antenna.

* * * * *